United States Patent
Shiba et al.

(10) Patent No.: US 6,889,115 B2
(45) Date of Patent: May 3, 2005

(54) POSITION CONTROL APPARATUS AND POSITION CONTROL METHOD

(75) Inventors: Kazuhiro Shiba, Shizuoka (JP); Minoru Hamamura, Shizuoka (JP); Jun Fujita, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 184 days.

(21) Appl. No.: 10/108,866

(22) Filed: Mar. 29, 2002

(65) Prior Publication Data

US 2002/0151988 A1 Oct. 17, 2002

(30) Foreign Application Priority Data

Mar. 30, 2001 (JP) ........................................ 2001-100187

(51) Int. Cl.[7] .............................................. G06F 19/00
(52) U.S. Cl. ...................... 700/186; 700/188; 700/193; 700/195
(58) Field of Search ................................ 700/186, 188, 700/193, 195

(56) References Cited

U.S. PATENT DOCUMENTS

| | | | | |
|---|---|---|---|---|
| 4,386,407 A | * | 5/1983 | Hungerford | 700/188 |
| 4,602,540 A | * | 7/1986 | Murofushi et al. | 82/118 |
| 4,748,554 A | * | 5/1988 | Gebauer et al. | 700/174 |
| 5,237,509 A | * | 8/1993 | Ueta et al. | 700/193 |
| 5,513,114 A | * | 4/1996 | Matsumoto | 700/193 |
| 6,097,168 A | * | 8/2000 | Katoh et al. | 318/568.11 |
| 2001/0012973 A1 | * | 8/2001 | Wehrli et al. | 700/193 |

* cited by examiner

Primary Examiner—Leo Picard
Assistant Examiner—Carlos R. Ortiz Rodriguez
(74) Attorney, Agent, or Firm—Pillsbury Winthrop, LLP

(57) ABSTRACT

A position control apparatus and method has been devised which provides for an improved means of suppressing tracking error from a variable position reference occurring when a control object positioned via a transmission mechanism with mechanical transmission error resumes movement from a state stopped at a target position. A selection between two alternative tracking error compensating means within the control apparatus is made based on whether the detected position of the control object changes in a period after the control object stops and before the variable position reference is input again to a control deviation generating unit.

12 Claims, 8 Drawing Sheets

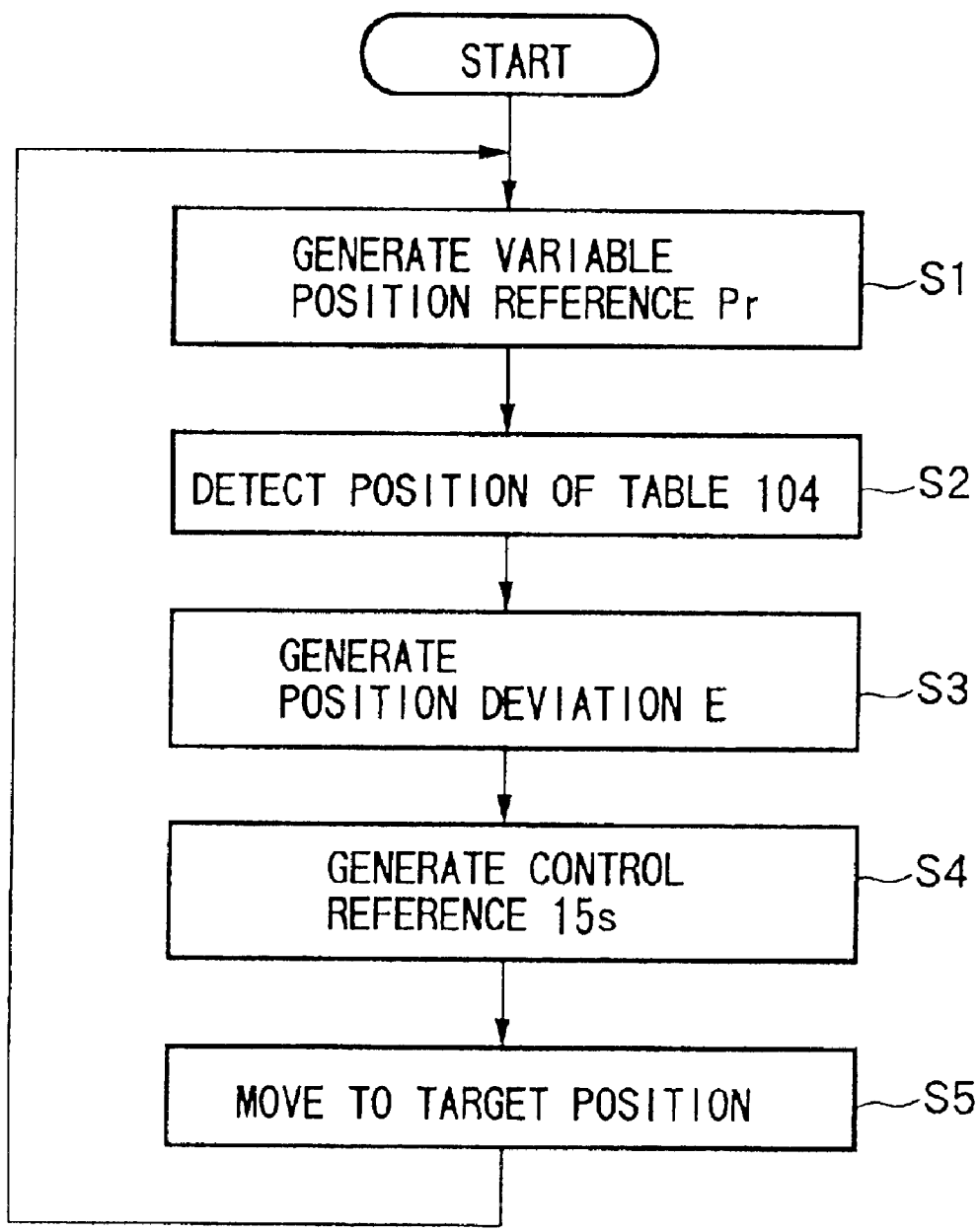

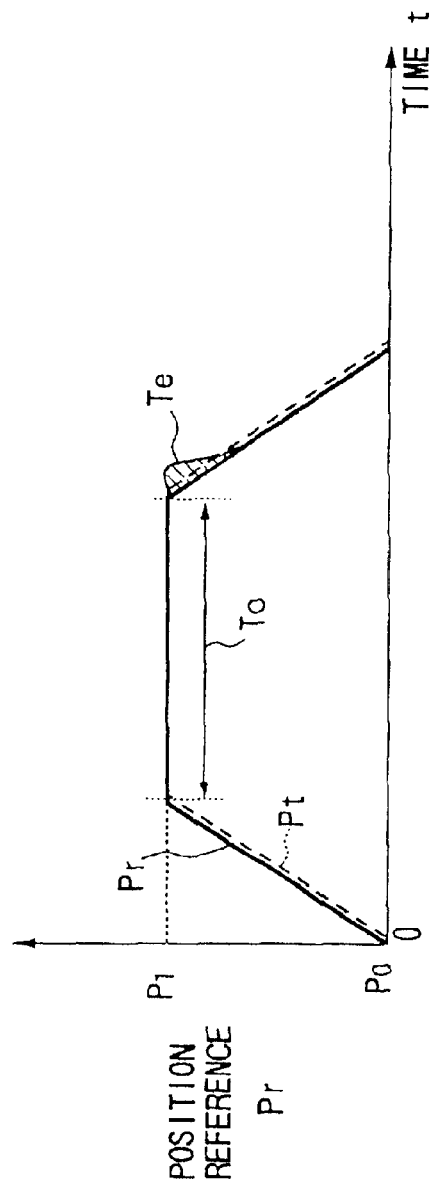
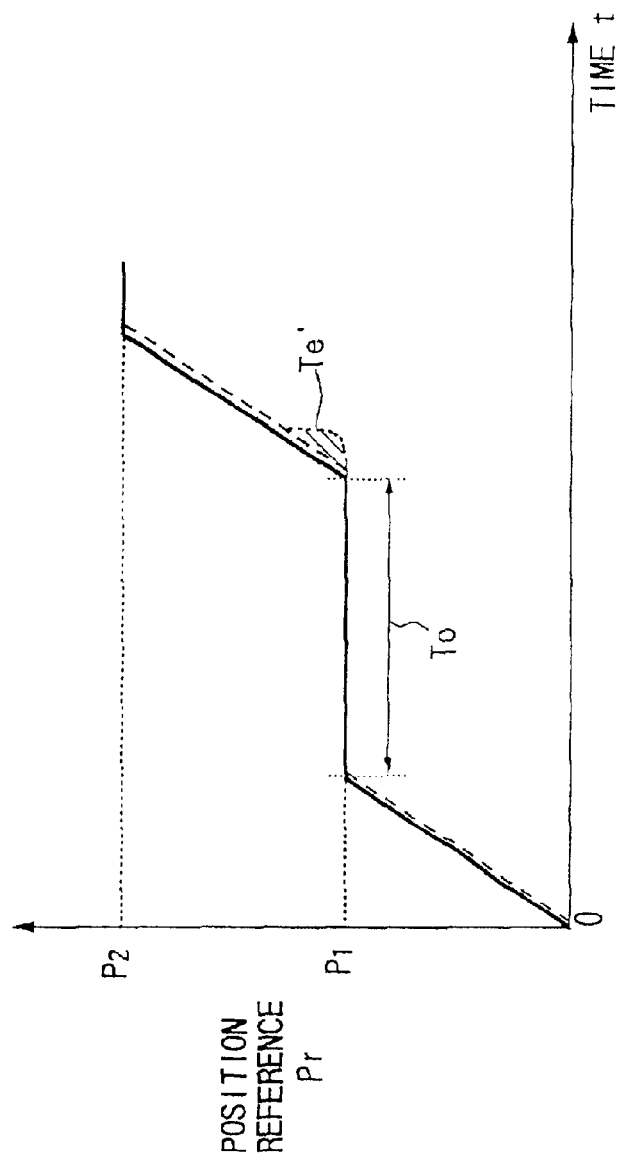
FIG.4A
FIG.4B

POSITION CONTROL APPARATUS AND POSITION CONTROL METHOD

BACKGROUND OF THE INVENTION

1. Field of the Invention

The present invention relates to an apparatus and method for controlling a position of a control object in a numerical control (NC) machine tool or other machine.

2. Description of the Related Art

Positional control of a control object such as a work table and a work cutting tool in an NC machine tool is generally achieved by controlling rotation of a servomotor connected to the control object via a transmission mechanism constructed for example by a rack and pinion or a ball screw and nut.

As methods for positional control of a control object, a semi-closed-loop control system, a full-closed-loop control system, and a hybrid control system are known.

In the semi-closed-loop control system, the servo control system is constructed to detect the rotational position of the servomotor by a rotary encoder or other detector, convert the detected rotational position of the servomotor to the position of the control object, then feed back the converted rotational position to a variable position reference for controlling the rotation of the servomotor.

In the full-closed-loop control system, the servo control system is constructed to directly attach for example a linear scale to the table or other control object and feed back the position of the control object detected by the linear scale to the variable position reference for controlling the rotation of the servomotor.

In the hybrid control system, the servo control system is constructed to detect both the rotational position of the servomotor and the position of the control object, feed back the rotational position of the servomotor converted to the position of the control object to the variable position reference, and filter the difference between the position of the control object and the converted rotational position of the servomotor by a first order lag filter, then feed it back to the variable position reference to control the rotation of the servomotor.

When there is backlash, friction, or other a non-linear characteristics in the transmission mechanism arranged between the servomotor and the control object, even if the rotational position of the servomotor is accurately controlled, when the feed direction of the control object reverses, the servomotor rotates, but the control object remains stopped, i.e., so-called "lost motion" occurs, and the control object does not immediately track the variable position reference.

As a method for compensating for this tracking error, so-called "backlash elimination" for detecting reversal of the feed direction in the variable position reference, then correcting the control reference to the servomotor to quickly eliminate the lost motion and thereby suppress tracking error of the control object from the variable position reference is known.

In the above-mentioned semi-closed-loop control system, the position of the control object is indirectly obtained from the rotational position of the servomotor and is not directly managed, so no offset occurs in the control object even with backlash elimination.

In the above-mentioned full-closed-loop control system, however, if such backlash elimination is performed while the control object is moving, that is, right in the middle of the change of the feedback value from the linear scale, the positional information of the control object is corrected and offset in the position of the control object.

On the other hand, in the hybrid control system, since the feedback value of the servo motor is used in addition to the feedback value from the linear scale, correction of the feedback value of the servomotor can prevent occurrence of offset in the positioning of the control object.

However, in the hybrid control system, since the detected position of the linear scale is controlled to match with the target position, if the feedback value of the position of the control object from the linear scale changes even slightly in the reverse direction from the direction where lost motion occurs right before reversal of the direction of movement of the control object, irrespective of the fact that the variable position reference is unchanged, the servomotor moves the control object past the lost motion region and stops it when the feedback value of the position of the control object and the variable position reference match, thereby canceling the lost motion.

If reversal of the feed direction in the variable position reference is detected from this state, however, backlash elimination kicks in and the control object ends up deviating from the target position for an instant. If such a phenomenon occurs, when controlling the control object to follow an arc by employing orthogonal double-axis control, the trajectory of the control object ends up cutting in from the arc at so-called quadrant switching points.

SUMMARY OF THE INVENTION

An object of the present invention is to provide a position control apparatus and method capable of suppressing tracking error from a variable position reference occurring when a control object positioned via a transmission mechanism with mechanical transmission error resumes movement from a state stopped at a target position.

According to a first aspect of the present invention, there is provided a position control apparatus for positioning a control object connected with a motor via a transmission mechanism so as to track a variable position reference varying with time, having a reference generating means for generating the variable position reference; a control deviation generating means for generating control deviation of the control object based on the variable position reference and a detected position of the control object; a servo control means for generating a control quantity to make the control object track the variable position reference based on the control deviation and controlling the driving of the motor; a tracking error compensating means having a first and second compensating means of different modes for compensating for the control deviation so as to suppress tracking error of the control object from the variable position reference caused by mechanical transmission error of the transmission mechanism; and a compensation selecting means for selecting a compensating means to be operated from the first and second compensating means based on whether the detected position of the control object changes in a period after the control object stops and before the variable position reference is input again to the control deviation generating means.

According to a second aspect of the present invention, there is provided a position control apparatus for positioning a control object connected with a motor via a transmission mechanism so as to track a variable position reference varying with time, having a reference generating means for generating the variable position reference; a control deviation generating means for generating control deviation of the control object based on the variable position reference and a detected position of the control object; a servo control means for generating a control quantity to make the control object track the variable position reference based on the control deviation and controlling the driving of the motor; a tracking error compensating means having first and second compensating means of different modes for correcting a detected rotational position of the motor to be used to generate the control deviation so as to suppress tracking error of the control object from the variable position reference caused by mechanical transmission error of the transmission mechanism; and a compensation selecting means for selecting a compensating means to be operated from the first and second compensating means based on whether the detected position of the control object changes in a period after the control object stops and before the variable position reference is input again to the control deviation generating means.

In the present invention, the motor is driven in response to the variable position reference and the detected position of the control object and the control object connected with this motor via a transmission mechanism tracks the variable position reference.

For example, when the variable position reference is stopped and the control object stops at a target position, if there is backlash, friction, elastic deformation, or other non-linear factors which causes lost motion in the transmission mechanism, the motor can be rotated finely in the range of the lost motion even if the control object is positioned at the target position. Due to this, in the present invention, a detection is made of whether the position of said control object changes in a period after the control object stops and before the variable position reference is input again to the control deviation generating means, and then a compensation is made so as to suppress tracking error of the controlled object from said variable position reference caused when movement of the controlled object by a compensation means in accordance with this detected result.

Further, in the present invention, a compensation corresponding to directions of movement is made in consideration of a feeding direction of the reference to be re-input in addition to whether the position of the above controlled object changes.

BRIEF DESCRIPTION OF THE DRAWINGS

These and other objects and features of the present invention will become clearer from the following description of the preferred embodiments given with reference to the accompanying drawings, in which:

FIG. 3 is a flowchart illustrating a position control method according to the present invention using the position control system 1 of the first embodiment;

FIG. 4A is a graph of an example of a variable position reference Pr including reversal of the feed direction in the first embodiment;

FIG. 4B is a graph of an example of a variable position reference Pr not including reversal of the feed direction in the first embodiment;

DESCRIPTION OF THE PREFERRED EMBODIMENTS

Below, preferred embodiments will be described with reference to the accompanying drawings.

First Embodiment

Figure 1:
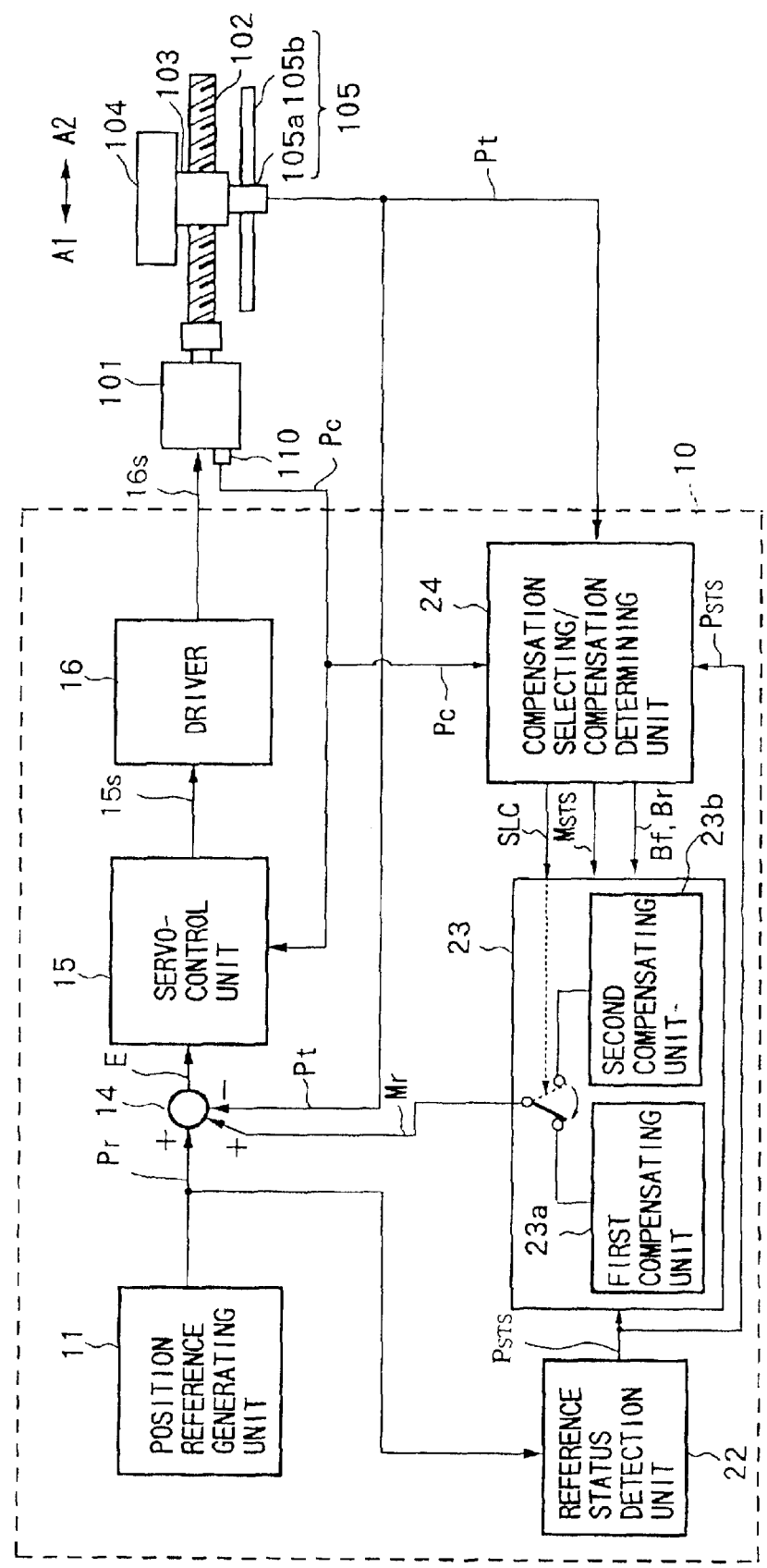
FIG. 1 is a view of the configuration of a position control system according to a first embodiment of the present invention.

FIG. 1 shows the configuration of a position control system according to a first embodiment of the present invention.

In FIG. 1, the position control system 1 is provided with a position control apparatus 10, a servomotor 101, a rotational position detector 110 of an optical or magnetic type connected to the servomotor 101, a ball screw shaft 102 connected to the servomotor 101 with a threaded part at the outer periphery, a movable member 103 having a threaded bore engaged with the threaded part of the ball screw shaft 102, a table 104 connected to the movable member 103 and held by a guide member (not shown) so as to be able to move in the axial directions of the ball shaft 102 shown by arrows A1 and A2, and a linear scale 105 constructed by a detector 105a affixed to the table 104 and a scale 105b extending along the directions A1 and A2.

In the claimed invention, the table 104 corresponds to the control object or controlled system, while the linear scale 105 corresponds to a position detector.

The ball screw shaft 102 is engaged with the threaded bore of the movable member 103. When the ball screw shaft 102 is rotated, the rotational movement of the ball screw shaft 102 is transformed to linear movement of the movable member 103. Due to this, linear movement of the table 104 is obtained.

There are backlash, friction, elastic deformation, and other non-linear factors between the ball screw shaft 102 and the movable member 103. Due to the non-linear characteristics between the ball screw shaft 102 and the movable part 103, mechanical transmission error is generated between the motor 101 and the table 104.

If there is mechanical transmission error, when the ball screw shaft 102 is rotated in one direction to move the table 104 in the direction of the arrow A2 and then the table 104 is moved in the direction of the arrow A1 by reversing the rotational direction of the ball screw 102, the rotational direction of the ball screw shaft 102 is reversed but the table 104 is not moved and remains stopped resulting in a lost motion.

In the linear scale 105, the detector 105a affixed to the table 104 magnetically or optically detects the position with respect to the scale 105b and feeds back this detected position signal Pt to the position control apparatus 10. This detected position signal Pt is, for example, comprised of a number of pulse signals corresponding to the displacement of the table 104.

The rotational position detector 110 detects a rotational position of the servomotor 101 and feeds back a detected rotational position signal Pc to the position control apparatus 10. This detected rotational position signal Pc is, for example, comprised of a number of pulse signals corresponding to the rotation of the rotational position detector 110.

The position control apparatus 10 is provided with a position reference generating unit 11, a control deviation generating unit 14, a servo-control unit 15, a driver 16, a reference status detecting unit 22, a tracking error compensating unit 23, and a compensation selecting/compensation determining unit 24.

In the claimed invention, the position reference generating unit 11 is generalized as the reference generating means, the control deviation generating unit 14 as the control deviation generating means, the servo-control unit 15 plus the driver 16 as the servo control means, the tracking error compensating unit 23 as the tracking error compensating means, and the compensation selecting/compensation determining unit 24 as the compensation selecting means plus the compensation determining means.

The position reference generating unit 11 outputs a variable position reference Pr corresponding to the target position to which the table is to be moved. This variable position reference Pr changes at each predetermined sampling time. The variable position reference Pr is for example given by a number of pulses.

The control deviation generating unit 14 generates control deviation E of the table 104 from the variable position reference Pr given from the position reference generating unit 11 and the detected position signal Pt given from the linear scale 105 and outputs it to the servo-control unit 15.

Specifically, it subtracts the detected position signal Pt of the table 104 from the variable position reference Pr to calculate the position deviation as the control deviation.

The servo-control unit 15 outputs a control reference 15s which makes the position of the table 104 track changes of and match with the variable position reference Pr based on the position deviation E given from the position deviation generating unit 14 to the driver 16.

Specifically, the servo-control unit 15 includes a velocity loop and a current loop, applies a proportional operation to the position deviation E by position loop gain, and outputs the result as a velocity reference to the velocity loop. In the velocity loop, it applies a proportional operation and integral operation to a deviation between the velocity reference and a difference (velocity feedback signal) of the detected rotational position signal Pc from the rotational position detector 110 for every sampling period to obtaining a torque reference which it then outputs to the current loop. In the current loop, it applies a proportional operation to the deviation between the output torque signal of the servomotor 101 converted from a driving current of the servomotor 101 and the above torque reference to obtain a current reference which it then converts to a predetermined signal 15s which it outputs to the driver 16.

The driver 16 outputs the driving current amplified in accordance with the control signal 15s input from the servo-control unit 15 as a control quantity 16s to the servomotor 101.

The reference status detecting unit 22 receives as input the variable position reference Pr generated at the position reference generating unit 11, detects the status of the variable position reference Pr, and outputs a detected reference status signal Psts to the tracking error compensating unit 23 and the compensation selecting/compensation determining unit 24.

Specifically, the reference status signal Psts has information of a feed direction of the variable position reference Pr and information whether the variable position reference is input or not. Accordingly, it becomes possible to detect a reversal of the feed direction of the variable position reference Pr, stopping of feed, and restart of feed from the reference status signal Psts.

The tracking error compensating unit 23 has a first compensating unit 23a and a second compensating unit 23b of different modes which can output a compensation reference Mr to the control deviation generating unit 14. The compensation reference Mr compensates for the control deviation E so as to suppress the tracking error of the table 104 from the variable position reference Pr caused by mechanical transmission error between the motor 101 and the table 104.

The first compensating unit 23a and the second compensating unit 23b are selected in accordance with a selecting signal SLC input from the compensation selecting/compensation determining unit 24. The selected one outputs the compensation reference Mr for compensating for the control deviation E to the control deviation generating unit 14.

Note that the specific processing routine in the first compensating unit 23a and the second compensating unit 23b will be described later.

The compensation selecting/compensation determining unit 24 receives as input the detected position signal Pt from the linear scale 105, the detected rotational position signal Pc from the rotational position detector 110, and the reference status signal Psts from the reference status detecting unit 22. The compensation selecting/compensation determining unit 24 generates the selecting signal SLC, a move/stop signal Msts, and compensation amounts Bf, Br based on the above signals and outputs them to the above tracking error compensating unit 23.

The compensation selecting/compensation determining unit 24 outputs a selecting signal SLC to select one of the first and second compensating units 23a, 23b to be operated. The selection is based on whether the detected position signal Pt from the linear scale 105 changes during the period after the table 104 stops by the variable position reference Pr stopping (remaining a constant value) and before the variable position reference Pr is input again to the control deviation generating unit 14 (the variable position reference Pr changes again).

Specifically, when the detected position signal Pt from the linear scale 105 does not change, it outputs a selecting signal SLC to select the first compensating unit 23a. When the detected position signal Pt from the linear scale 105 changes, it outputs a selecting signal SLC to select the second compensating unit 23b.

Further, the compensation selecting/compensation determining unit 24 judges whether the table 104 is in a moving state or a stopped state based on the detected position signal Pt input from the linear scale 105 and outputs a move/stop signal Msts in accordance with the results of the judgment to the tracking error compensating unit 23.

Further, the compensation selecting/compensation determining unit 24 outputs the compensation amounts Bf, Br to be used by the second compensating unit 23b to the tracking error compensating unit 23 based on the detected position signal Pt input from the linear scale 105 and the detected rotational position signal Pc.

Note that the specific processing routine of the compensation selecting/compensation determining unit 24 will be described later.

Figure 2:
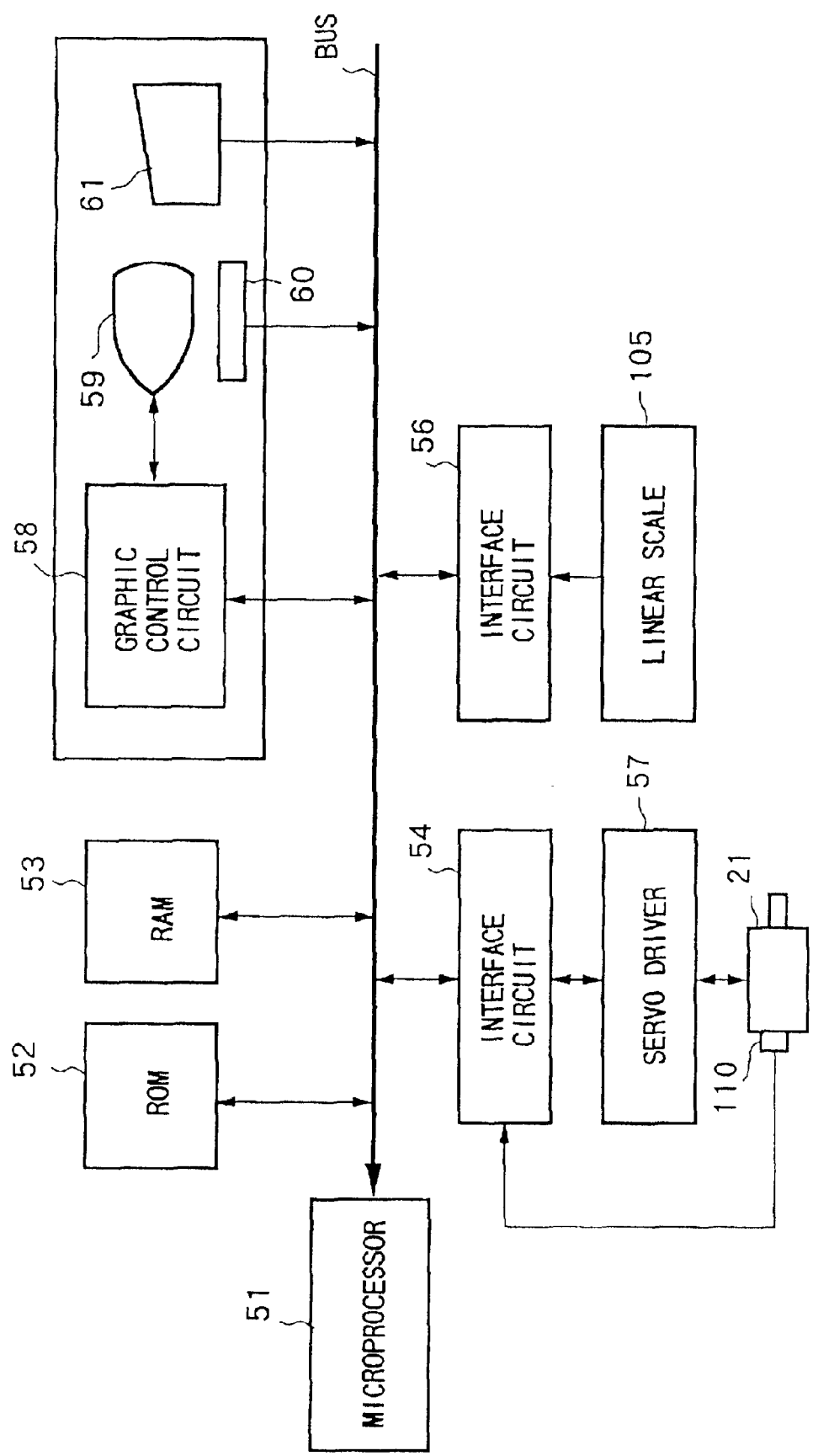
FIG. 2 is a view of a hardware configuration of a position control apparatus 10.

FIG. 2 is a view of an example of the hardware configuration of the position control apparatus 10 of the above configuration.

In FIG. 2, a microprocessor 51 is connected via a bus 49 to a read only memory (ROM) 52, a random access memory (RAM) 52, interface circuits 54 and 56, a graphic control circuit 58, a display 59, a keyboard 61, and a software key 60.

The microprocessor 51 operates in accordance with a system program stored in the ROM 52 for controlling the position control apparatus 10.

The ROM 52 has stored in it programs for realizing the above position reference generating unit 11, the control deviation generating unit 14, the servo-control unit 15, the reference status detecting unit 22, the tracking error compensating unit 23, the compensation selecting/compensation determining unit 24, etc. and the system program and other required software.

The RAM 53 downloads programs stored in the ROM 52, stores various types of programs, data, etc., and for example stores compensation amounts to be used by the tracking error compensating unit 23 etc.

The graphic control circuit 58 converts digital signals to display signals and gives them to the display 59.

For the display 59, for example, a CRT display or a liquid crystal display is used. The display 59 displays shapes, machining conditions, generated machining programs, etc. when the software key 60 or keyboard 61 is used by an operator to prepare a machining program by a dialog mode.

The software key 60 and keyboard 61 are also used for inputting desired data into the position control apparatus 10.

The interface circuit 54 converts the control reference for the servomotor 101 output from the microprocessor 51 to a predetermined signal which it outputs to the driver 16 and sequentially samples the detected signal 110s of the rotational position detector 110 and outputs the same to the microprocessor 51.

The interface circuit 56 samples the feedback signal 105s output from the linear scale 105 at a predetermined period, converts it to a predetermined digital signal, and outputs it to the microprocessor 51.

Next, an explanation will be given of the position control method according to the present invention using the above configured position control system 1.

First, an explanation will be made of the basic control method in the position control system 1 with reference to FIG. 3.

As shown in FIG. 3, the position reference generating unit 11 generates a variable position reference Pr to specify the target position to which the table 104 is to be moved and outputs sequentially the variable position reference Pr to the control deviation generating unit 14 at each predetermined sampling time (step S1).

On the other hand, the linear scale 105 detects a position of the table 104 and feeds back the detected position signal Pt of the table 104 to the control deviation generating unit 14 (step S2).

The control deviation generating unit 14 subtracts the fed back detected position Pt of the table 104 from the variable position reference Pr to generate a position deviation E from the variable position reference Pr of the table 104 (step S3).

The position deviation E generated in the control deviation generating unit 14 is input to the servo control unit 15.

The servo control unit 15 generates a control reference 15s to make the position of the table track the target position based on the input position deviation E (step S4) and outputs the same to the driver 16.

The driver 16 supplies a driving current corresponding to the input control reference 15s as a control quantity to the servo motor 101. As a result, the servo motor is driven and the table 104 tracks the variable position reference Pr. When the variable position reference Pr stops (variable position reference Pr becomes constant value), the table 104 will be positioned at the target position.

Next, the processing routine in the compensation selecting/compensation determining unit 24 and the tracking error compensating unit 23 will be described.

Before the specific processing routine is described, a specific example of the variable position reference Pr to which the tracking error compensation according to the present embodiment is applied will be described with reference to FIGS. 4A and 4B. Note that the variable position reference Pr is illustrated by a solid line in FIGS. 4A and 4B and an example of response of the position Pt of the table 104 to the variable position reference Pr is illustrated by a dotted line.

The variable position reference Pr shown in FIG. 4A is an example of a reference for moving the table 104 from a position P0 to a position P1 at a constant speed, positioning the table 104 to the position P1, then, after the passage of a predetermined time at the position p1, reversing the feed direction from the position P1 and positioning to the position p0 again.

In the variable position reference Pr shown in FIG. 4A, when the position Pt of the table 104 does not change during the period after moving and positioning the table 104 from the position p0 to the position p1 and before the passage of the predetermined time, a tracking error Te is generated when reversing the feed direction of the table 104 and restarting movement of the table 104 from the position P1 to the position P0.

In the present embodiment, the position deviation E is compensated for by the above first compensating unit 23a so as to suppress the occurrence of this tracking error Te.

In the variable position reference Pr shown in FIG. 4A, if the position Pt of the table 104 is moved from the position p1 during the period before the variable position reference Pr for moving from the position p1 to the position p0 is input, that is, after the table 104 stops at the position p1 and before the variable position reference Pr is input, position deviation E occurs even if the variable position reference Pr is not input. Due to this, the servo motor 101 rotates. There is possibility that the servo motor 101 will pass through the lost motion region to cancel the position deviation E.

If the position Pt of the table 104 is moved from the position P1 during the period before the table 104 resumes movement from the stopped state to the position P0, the state of the ball screw shaft 102 or other transmission mechanism changes from the state of the stopped table 104 and the amount of the tracking error Te becomes different from that when the position Pt of the table 104 does not change.

Therefore, if trying to compensate for the tracking error Te in the same way as with the tracking error Te occurring when the position Pt of the table 104 does not change, conversely there is a possibility that the variable position reference Pr will no longer be tracked for an instant.

In the present embodiment, as described later, when the position Pt of the table 104 changes in the period after the table 104 stops and before the variable position reference Pr is input, the second compensating unit 23b compensates for the position deviation so that the position Pt of the table 104 does not deviate from the variable position reference Pr.

On the other hand, the variable position reference Pr shown in FIG. 4B is an example of a reference for moving the table 104 from a position P0 to a position P1 at a constant speed, positioning the table 104 at the position p1, then, after passage of a predetermined time, positioning it at the position P2 located ahead of the position P1.

In case of the variable position reference Pr shown in FIG. 4B, if the position Pt of the table 104 does not change during the period after the table 104 stops at the position p1 and before the variable position reference Pr is input, lost motion almost never occurs when restarting the movement from the stopped state.

However, when the position Pt of the table 104 changes in the period after the table 104 stops and before the variable position reference Pr is input, the state of the ball screw shaft 102 or other transmission mechanism changes, so when moving ahead again, tracking error Te occurs due to lost motion as shown in FIG. 4B.

Due to this, in the present embodiment, as described later, when the position of the table 104 changes and moves ahead again during the period after the table 104 stops and before the variable position reference Pr is input as well, the position deviation E is compensated for by the second compensating unit 23b so that the position Pt of the table 104 does not deviate from the variable position reference Pr.

Next, an explanation will be made of the processing routine of the compensation selecting/compensation determining unit 24 and the tracking error compensating unit 23 with reference to flowcharts shown in FIG. 5 and FIG. 6.

Figure 5:
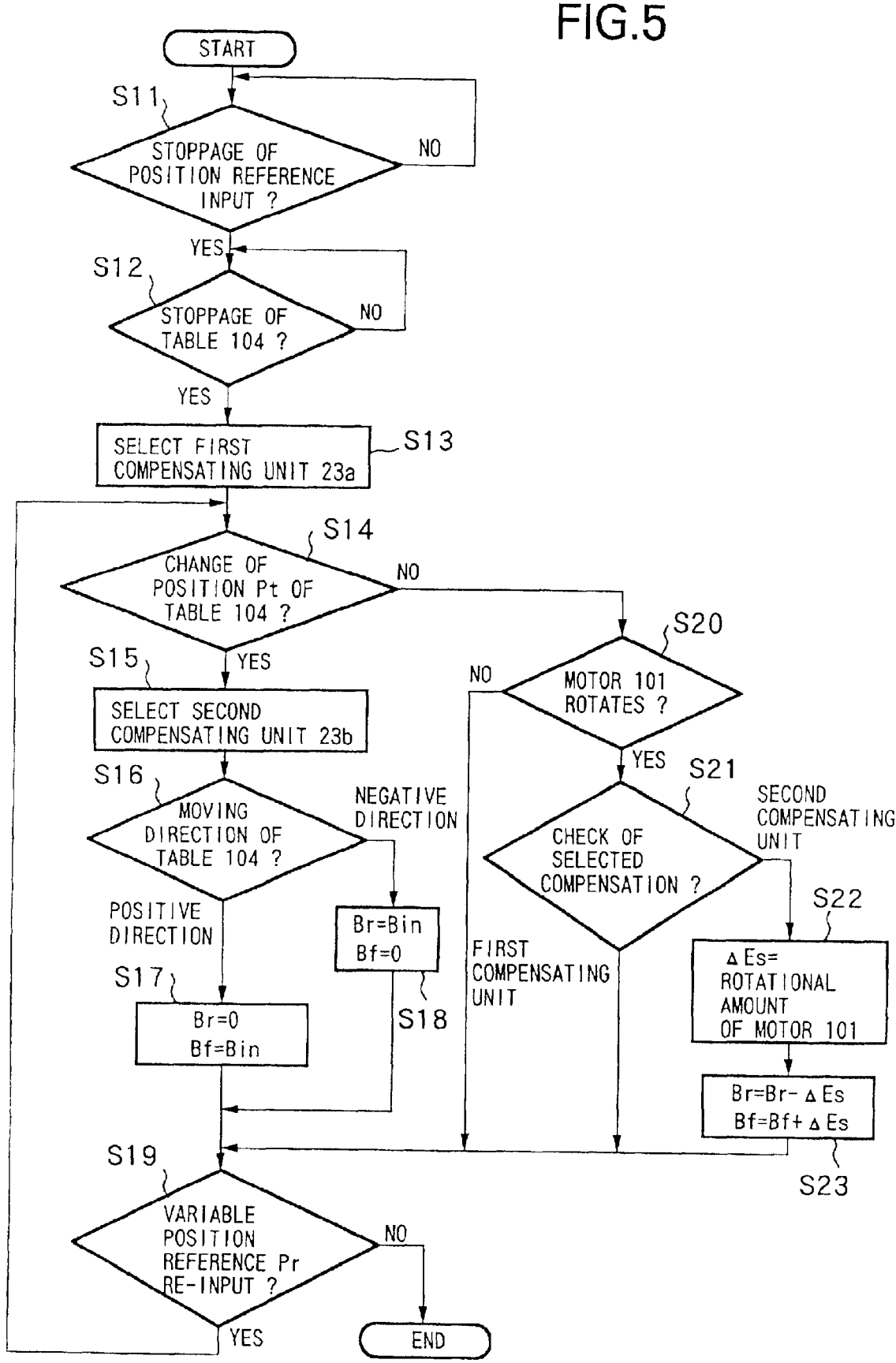
FIG. 5 is a flowchart illustrating a processing routine in a compensation selecting/compensation determining unit 24.

FIG. 5 is a flowchart of a processing routine of the compensation selecting/compensation determining unit 24.

The compensation selecting/compensation determining unit 24 detects the stopped state of the variable position reference Pr (variable position reference Pr becomes constant) based on the reference status signal Psts from the reference status detecting unit 22 (step S11).

In the case of the variable position reference Pr shown in FIG. 4A and FIG. 4B, when the table 104 approaches the position P1, the stopping of the variable position reference Pr is detected.

When the table 104 reaches the position P1 and stops, this stopping of the table 104 is detected from the detected position signal Pt of the linear scale 105.

Next, the compensation selecting/compensation determining unit 24 designates the first compensating unit 23a as the compensating means to be selected by the selecting signal SLC (step S13). By this, it outputs a selecting signal SLC having content to select the first compensating unit 23a to the tracking error compensating unit 23.

In the state where table 104 is stopped, whether the detected position Pt of the table 104 changes or not is monitored (step S14).

When the detected position Pt of the table 104 changes due to a disturbance or the like, as described above, the engagement state of the ball screw shaft 102 or other transmission mechanism from the time where the table 104 stops at the position p1 changes.

Due to this, the compensation selecting/compensation determining unit 24 designates the second compensating unit 23b as the compensating means to be selected by the selecting signal SLC in place of the first compensating unit 23a (step S15). By this, it outputs a selecting signal SLC having content to select the second compensating unit 23a to the tracking error compensating unit 23.

Next, the compensation selecting/compensation determining unit 24 detects the direction of movement of the table 104 when the detected position of the table 104 changes (step S16).

Note that the direction of the table 104 moving from the position p0 to the position p1 is defined as the forward direction and the direction of the table 104 moving from the position p1 to the position p2 is defined as the reverse direction.

The compensation selecting/compensation determining unit 24 sets compensation amounts Bf, Br to be used in the second compensating unit 23b of the tracking error compensating unit 23 when detecting the direction of movement of the table 104.

Note that the compensation amount Bf is a compensation amount used when the feed direction is the forward direction, while Br is a compensation amount used when the feed direction is the reverse direction when the variable position reference Pr is input.

If the direction of movement of the table 104 is the forward direction, the compensation amount Br is set to 0 and the compensation amount Bf is set to a predetermined value Bin (step S17).

If the direction of movement of the table 104 is the reverse direction, the compensation amount Br is set to the predetermined value Bin and the compensation amount Bf is set to 0 (step S18).

Next, the compensation selecting/compensation determining unit 24 confirms whether the variable position reference Pr is input or not (step S19).

If the variable position reference Pr is not re-input, the routine returns to step S14 and the same processing as the above is repeated. If the variable position reference Pr is re-input, the processing ends.

Note that the processing from step S14 to step S19 is performed at predetermined sampling periods, for example, of the position control loop.

On the other hand, if the detected position of the table 104 does not change at step S14, whether the motor rotates or not is monitored (step S20).

If the detected position Pt of the table 104 does not change and the motor 101 does not rotate, it is confirmed whether the variable position reference Pr is re-input or not (step S19).

If the motor 101 is rotating, a check of which of the first compensating unit 23a and the second compensating unit 23b is selected by the selecting signal SLC currently is performed (step S21).

If the first compensating unit 23a is selected, that is, if the detected position Pt of the table 104 has not changed yet after the table 104 stops at the position p1, it is confirmed whether the variable position reference Pr is re-input or not (step S19).

Only if the second compensating unit 23b is selected, that is, if the detected position Pt of the table 104 changes after the table 104 stops at the position p1, the rotation Es of the motor 101 from the point of time where the table 104 stopped to the present time is obtained from a detected rotational position signal Pc of the rotational position detector 110 (step S22).

Next, after the rotation Es of the motor 101 is obtained, the rotation Es is subtracted from the reverse direction compensation amount Br and the rotation Es is added to the forward direction compensation amount Bf (step S23).

Accordingly, when the motor 101 is rotating from the time where it stopped until the present time, the values of the reverse direction compensation amount Br and the forward direction compensation amount Bf are changed by the rotation Es. Due to this, the compensation amount Br and the compensation amount Bf held in the tracking error compensating unit 23 are updated.

When the change of the values of the reverse direction compensation amount Br and the forward direction compensation amount Bf due to the rotation Es is completed, it is confirmed whether the variable position reference Pr is re-input or not (step S19).

Note that the processing of step S20 to step S23 is performed at each predetermined sampling period of for example the position control loop.

Figure 6:
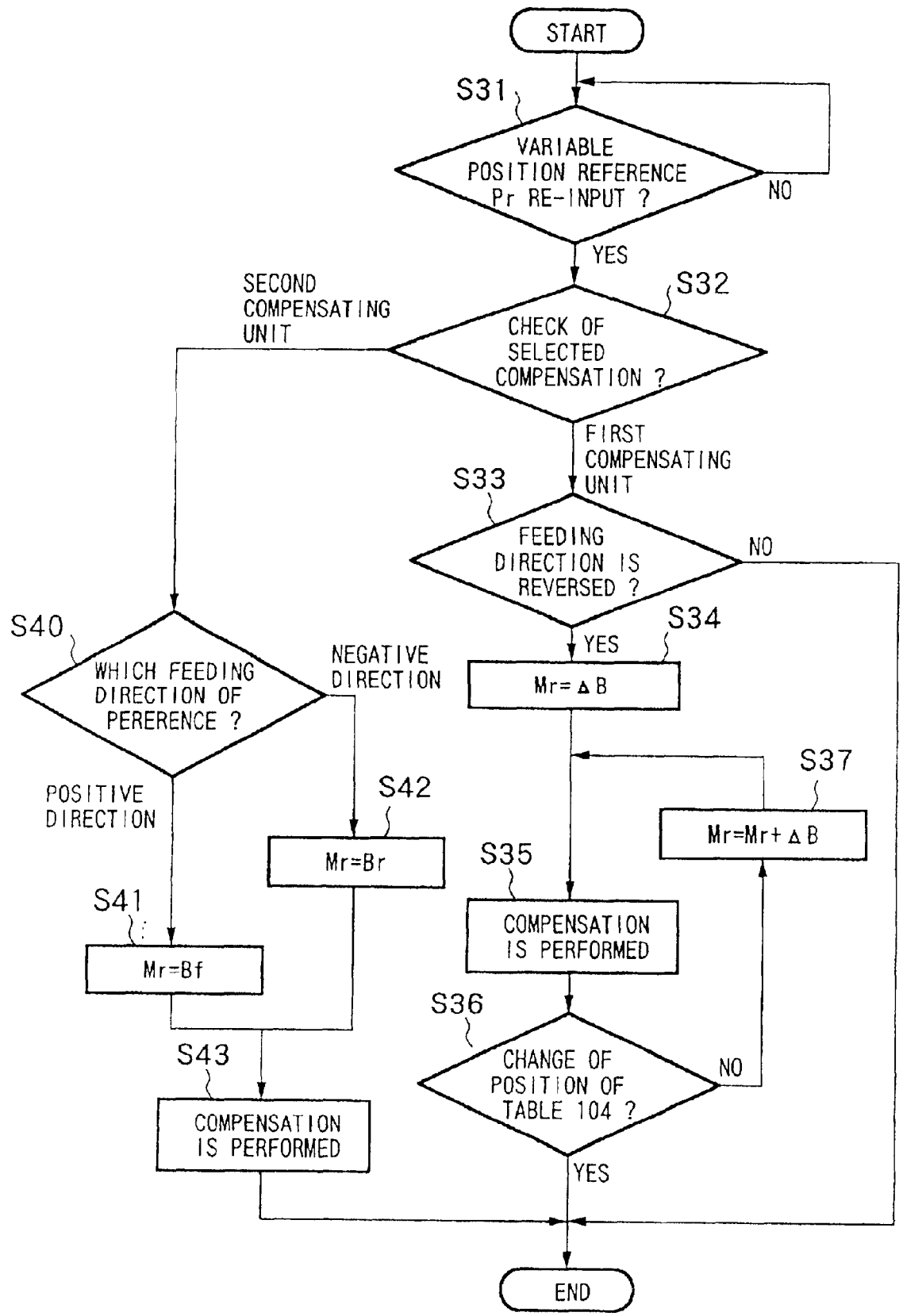
FIG. 6 is a flowchart illustrating a processing routine in a tracking error compensating unit 23.

FIG. 6 is a flowchart showing the processing routine of the tracking error compensating unit 23.

The tracking error compensating unit 23 monitors for the input of the variable position reference Pr for moving the table 104 positioned at the position P1 to the position P0 or the position P2 based on the reference status signal Psts from the reference status detecting unit 22 (step S31). Note that in this state, the table 104 stops at the position P1.

The tracking error compensating unit 23 checks which of the first compensating unit 23*a* and the second compensating unit 23*b* is selected based on the selecting signal SLC if the variable position reference Pr is re-input (step S32).

Next, if the first compensating unit 23*a* is selected by the selecting signal SLC, it is confirmed whether the feed direction of the variable position reference Pr is reversed or not (step S33). The purpose of confirming the feed direction of the variable position reference is for compensation only when the feed direction is reversed. That is, compensation is not performed when the feed direction of the variable position reference Pr re-input is not reversed such as with the variable position reference Pr shown in FIG. 4B.

When the feed direction of the variable position reference Pr is reversed, a compensation amount ΔB is set as an initial value of the compensation reference Mr for compensating for the control deviation E.

Note that the compensation amount ΔB can be determined for example by measuring the lost motion generated between the table 104 and the motor 101 in advance. Further, the compensation amount ΔB is a smaller value than the compensation amount used for usual backlash elimination. Furthermore, the compensation amount ΔB has positive and negative signs in accordance with the feed direction of the table 104.

After setting the compensation amount ΔB as an initial value of the compensation reference Mr, compensation is performed (step S35). By this, the position deviation E is compensated for.

After the position deviation E is compensated for, it is confirmed whether the movement of the table 104 is restarted or not (step S36).

When the movement of the table 104 is not restarted, the compensation amount ΔB is added to the compensation reference Mr to update the compensation reference Mr (step S37).

The purpose of periodically updating the compensation reference Mr with the compensation amount ΔB in this way is to avoid the sudden movement of the table 104 by gradually changing the compensation reference Mr.

Note that it is possible to employ a configuration setting a constant compensation amount for the compensation reference Mr without updating it and continuing compensation until movement of the table 104 is restarted.

When the compensation reference Mr is added to the position deviation E, the position deviation E increases in appearance. By this increase of the position deviation E, the servo motor 101 is accelerated and the ball screw shaft 102 passes rapidly through the lost motion region. As a result, the tracking error of the table 104 from the variable position reference Pr is suppressed.

The first compensating unit 23*a* of the tracking error compensating unit 23 terminates compensation of the position deviation E with the compensation reference Mr when the movement of the table 104 is restarted.

Note that compensation by the compensation reference Mr is performed at each sampling time for example of the position control loop.

On the other hand, if the tracking error compensating unit 23 confirms at step S32 that the second compensating unit 23*b* is selected by the selecting signal SLC, it is confirmed if the feed direction of the re-input variable position reference Pr is the forward direction or the reverse direction.

The feed direction of the variable position reference Pr shown in FIG. 4B is the forward direction, so the forward direction compensation amount Bf is set to the compensation reference Mr (step S41). The feed direction of the variable position reference Pr shown in FIG. 4A is the reverse direction, so the reverse direction compensation amount Br is set to the compensation reference Mr (step S42).

When the compensation amount Br or the compensation amount Bf is set to the compensation reference Mr in accordance with the direction of the variable position reference Pr, the position deviation E is compensated for (step S43).

By this, the tracking error of the table 104 from the variable position reference Pr generated at the time when the table 104 is moved to the position P0 or the position P2 after the table 104 stops can be suppressed.

Further, information of the rotation Es of the motor 101 after the table 104 is positioned to the position P1 is added to the compensation amount Br or Bf. Due to this, the compensation does not become excessive or insufficient and it becomes possible to optimally suppress the tracking error.

As above described, according to the present embodiment, it becomes possible to suitably suppress tracking error from the variable position reference Pr generated when movement of the table 104.

Further, according to the present embodiment, it becomes possible to suitably suppress tracking error when the table 104 moves in either direction after being positioned at the position P1.

Furthermore, because of obtaining the rotation Es of the servo motor 101 at the time when the detected position Pt is not changed after being positioned to the position P1 and generating a compensation amount with the rotation Es, it becomes possible to make the interrelationship between the position of the table 104 and the position of the servo motor 101 regular so that the compensation amount Br or Bf calculated with the rotation Es becomes precise.

Furthermore, according to the present embodiment, because of not correcting the detected position Pt of the table 104, that is, the detected position signal Pt of the linear scale 105, offset between the position of the table 104 and the variable position reference Pr does not occur.

Second Embodiment

Figure 7:
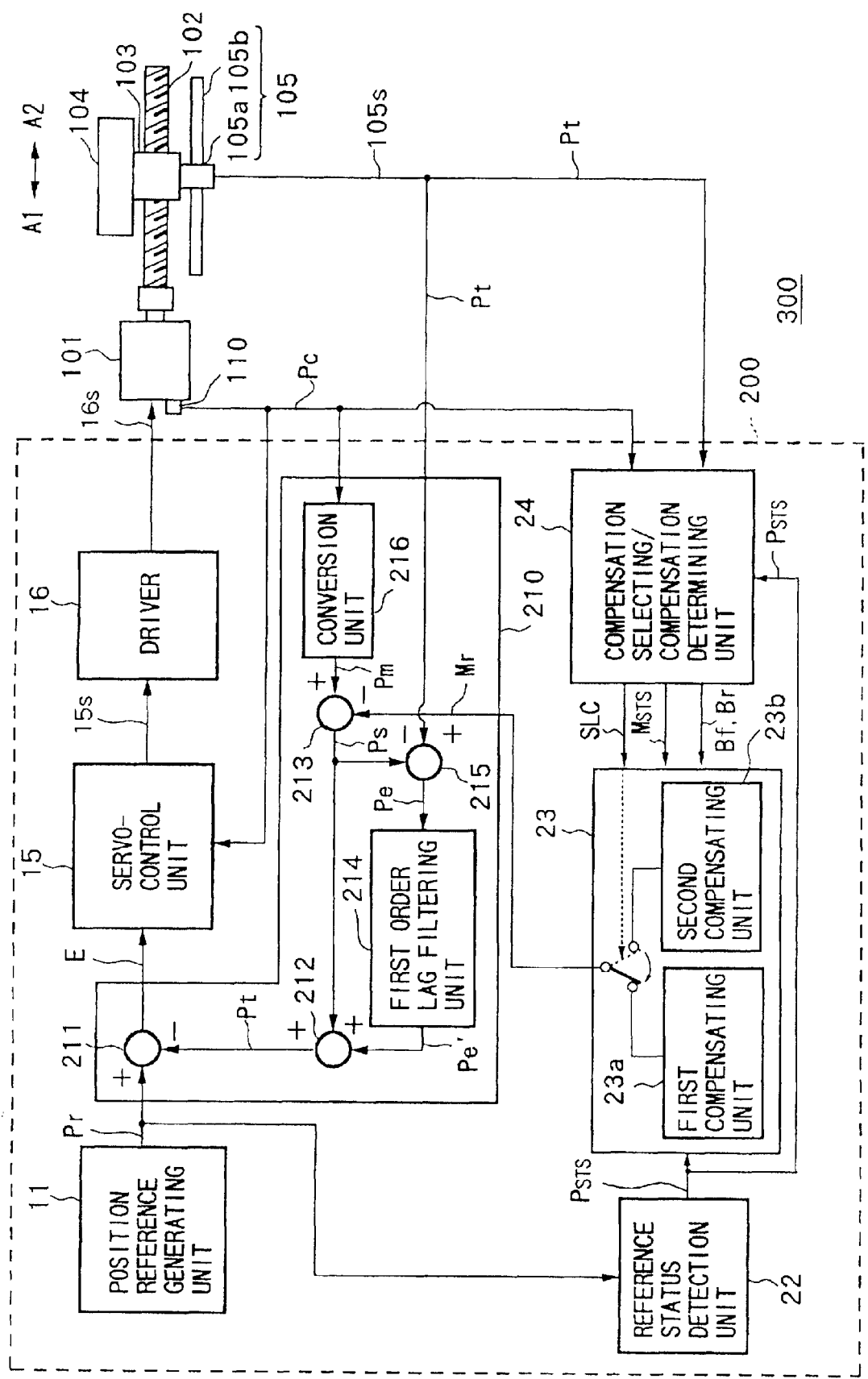
FIG. 7 is a view of the configuration of a position control system according to a second embodiment of the present invention.

FIG. 7 is a view of the configuration of a position control system according to a second embodiment of the present invention.

In FIG. 7, the same reference numerals are used for parts the same as in the above described embodiment.

The difference between the position control system according to the present embodiment and the position control system according to the first embodiment is a control deviation generating unit 210 in the position control apparatus 200 according to the present embodiment.

Further, in the position control system 300 according to the present embodiment, the detected rotational position signal Pc of an optical or electromagnetic type rotational position sensor 110 mounted to the servomotor 101 is fed back to the control deviation generating unit 210.

The control deviation generating unit 210 has a converting unit 216, a position error calculating unit 215, a filtering unit 214, a position calculating unit 212, subtracting unit 213, and position deviation calculating unit 211.

The converting unit 216 converts the detected rotational position signal Pc of the rotational position detector 110 for detecting a rotational position of the servo motor 101 to a position Pm of the table 104 and outputs the converted rotational position Pm to the subtracting unit 213.

The position error calculating unit 215 calculates the position error Pe between the rotational position Pm of the servo motor 101 converted by the converting unit 216 and the detected position signal Pt of the linear scale 105 and outputs this position error Pe to the filtering unit 214.

The filtering unit 214 applies first order lag filtering to the position error Pe to smooth it and outputs the smoothed positional error Pe to the position calculating unit 212.

The subtracting unit 213 subtracts the compensation reference Mr output from the tracking error compensating unit 23 out of the converted position Pm from the converting unit 216 and outputs it as the compensated position Ps to the deviation calculating unit 212 and the tracking error calculating unit 215.

The position calculating unit 212 adds the smoothed position error Pe output from the filtering unit 214 to the compensated position Ps output from the subtracting unit 213 and outputs it as the real position Ptr to the position deviation calculating unit 211.

The position deviation calculating unit 211 calculates the position deviation E by subtracting the real position Ptr of the table 104 output from the position calculating unit 212 out of the variable position reference Pr output from the position reference generating unit 11.

Figure 8:
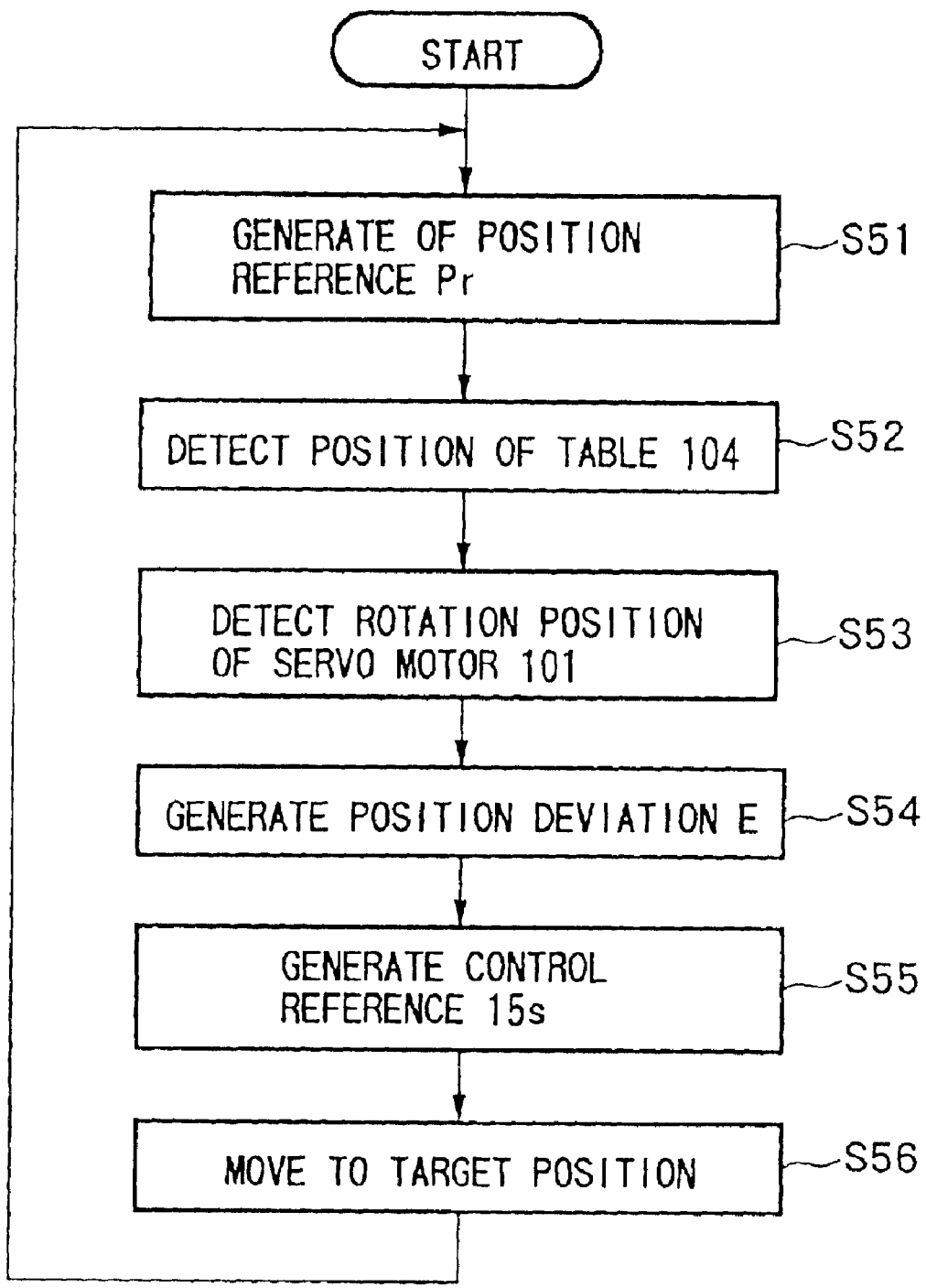
FIG. 8 is a flowchart illustrating a position control method according to the present invention using the position control system according to the second embodiment of the present invention.

Next, an explanation will be made of the basic control method of the position control system according to the present embodiment with reference to the flowchart shown in FIG. 8.

First, the position reference generating unit 11 generates the variable position reference Pr and outputs it to the position deviation calculating unit 211 of the control deviation generating unit 210 at each predetermined sampling tame (step S51).

On the other hand, the linear scale 105 detects the position of the table 104 and sequentially feeds back the detected position signal Pt of the table 104 to the control deviation generating unit 210 (step S52).

Further, the rotational position detector 110 mounted to the servo motor 101 sequentially feeds back the detected rotational position signal Pc to the control deviation generating unit 210 (step S53).

The control deviation generating unit 210 generates the position deviation E from the input variable position reference Pr, the feedback signal Pt from the linear scale 105, and the feedback signal Pc from the rotational position detector 110 (step S54). It outputs the generated position deviation E to the servo-control unit 15.

The servo-control unit 15 generates a control quantity 15s to make the position of the table 104 track a target position based on the input position deviation E (step S55). By this, the table 104 tracks the variable position reference. When the variable position reference Pr stops, the table 104 is positioned at the target position.

In this way, the position control system according to the present embodiment employs a so-called hybrid control system which controls the position of the table 104 using both of the detected position signal Pt of the linear scale 105 and the detected rotational position signal Pc.

In the present embodiment, this hybrid control system generates the compensation reference Mr by the same processing routine as described in the above first embodiment and corrects the detected rotational position signal Pm of the rotational position detector 110 after being converted. Accordingly, the explanation of a specific processing in the reference status detecting unit 22, tracking error compensating unit 23, and the compensation selecting/compensation determining unit 24 will be omitted.

By configuring the system in this way, it is possible to obtain the same effect as the first embodiment also in the hybrid control system.

While the invention has been described with reference to specific embodiments chosen for purpose of illustration, it should be apparent that numerous modifications could be made thereto by those skilled in the art without departing from the basic concept and scope of the invention.

What is claimed is:

1. A position control apparatus for positioning a control object connected with a motor via a transmission mechanism so as to track a variable position reference varying with time, comprising:

a reference generating means for generating said variable position reference;

a control deviation generating means for generating control deviation of the control object based on said variable position reference and a detected position of said control object;

a servo control means for generating a control quantity to make said control object track said variable position reference based on said control deviation and controlling the driving of said motor;

a tracking error compensating means having a first and second tracking error compensating means of different modes for compensating for said control deviation so as to suppress tracking error of said control object from said variable position reference caused by mechanical transmission error of said transmission mechanism;

a compensation selecting means for selecting one of said first and second tracking error compensating means based on whether the detected position of said control object changes during a period after said control object stops at a target position and before a next variable position reference is inputted to said control deviation generating means; and a compensation determining means for determining a compensation amount required for said second tracking error compensating means to perform compensation based on the detected position of said control object and a detected rotational position of said motor when said second tracking error compensating means is selected by said compensation selecting means.

2. A position control apparatus as set forth in claim 1, wherein said first compensation determining means holds first and second compensation amounts corresponding to directions of movement of said control object and determines said first and second compensation amounts in accordance with a direction of change of the detected position of said control object.

3. A position control apparatus as set forth in claim 2, wherein said second tracking error compensating means selects one of said first and second compensation amounts determined by said compensation determining means and compensates for said control deviation in accordance with a feed direction of said next variable position reference.

4. A position control apparatus for positioning a control object connected with a motor via a transmission mechanism so as to track a variable position reference varying with time, comprising:

a reference generating means for generating said variable position reference;

a control deviation generating means for generating control deviation of the control object based on said variable position reference and a detected position of said control object;

a servo control means for generating a control quantity to make said control object track said variable position reference based on said control deviation and controlling the driving of said motor;

a tracking error compensating means having first and second tracking error compensating means of different modes for correcting a detected rotational position of said motor to be used to generate said control deviation so as to suppress tracking error of said control object from said variable position reference caused by mechanical transmission error of said transmission mechanism;

a compensation selecting means for selecting one of said first and second tracking error compensating means based on whether the detected position of said control object changes during a period after said control object stops at a target position and before a next variable position reference is inputted to said control deviation generating means; and a compensation determining means for determining a compensation amount which said second tracking error compensating means requires to perform compensation based on the detected position of said control object and a detected rotational position of said motor when said second tracking error compensating means is selected by said compensation selecting means.

5. A position control apparatus as set forth in claim 4, wherein said compensation determining means holds first and second compensation amounts corresponding to directions of movement of said control object and determines said first and second compensation amounts in accordance with a direction of change of the detected position of said control object.

6. A position control apparatus as set forth in claim 5, wherein said second tracking error compensating means selects one of said first and second compensation amounts determined by said compensation determining means and corrects the detected rotational position of said motor to be used to generate said control deviation in accordance with a feed direction of said next variable position reference.

7. A position control apparatus for positioning a control object connected with a motor via a transmission mechanism so as to track a variable position reference varying with time, comprising:

a reference generating means for generating said variable position reference;

a control deviation generating means for generating control deviation of the control object based on said variable position reference and a detected position of said control object;

a servo control means for generating a control quantity to make said control object track said variable position reference based on said control deviation and controlling the driving of said motor;

a tracking error compensating means having a first and second tracking error compensating means of different modes for compensating for said control deviation so as to suppress tracking error of said control object from said variable position reference caused by mechanical transmission error of said transmission mechanism;

a compensation selecting means for selecting one of said first and second tracking error compensating means based on whether the detected position of said control object changes during a period after said control object stops at a target position and before a next variable position reference is inputted to said control deviation generating means; and a compensation determining means for determining a compensation amount required for said second tracking error compensating means to perform compensation based on the detected position of said control object and a detected rotational position of said motor when said second tracking error compensating means is selected by said compensation selecting means;

wherein said first tracking error compensating means compensates for said control deviation so as to suppress said tracking error during a period after said next variable position reference is inputted and before said control object starts to move again;

wherein said second tracking error compensating means compensates for said control deviation so as to suppress said tracking error with a predetermined compensation amount in accordance with a feed direction of said variable position reference after said next variable position reference is inputted; and wherein said compensation selecting means selects said first tracking error compensating means when the detected position of said control object does not change during a period after said control object stops at a target position and before said next variable position reference is inputted to said control deviation generating means and selects said second tracking error compensating means when the detected position of said control object changes during said period.

8. A position control apparatus as set forth in claim 7, wherein said compensation determining means holds first and second compensation amounts corresponding to directions of movement of said control object and determines said first and second compensation amounts in accordance with a direction of change of the detected position of said control object.

9. A position control apparatus as set forth in claim 8, wherein said second tracking error compensating means selects one of said first and second compensating amounts determined by said compensation determining means and compensates for said control deviation in accordance with a feed direction of said next variable position reference.

10. A position control apparatus for positioning a control object connected with a motor via a transmission mechanism so as to track a variable position reference varying with time, comprising:

a reference generating means for generating said variable position reference;

a control deviation generating means for generating control deviation of the control object based on said variable position reference and a detected position of said control object;

a servo control means for generating a control quantity to make said control object track said variable position reference based on said control deviation and controlling the driving of said motor;

a tracking error compensating means having first and second tracking error compensating means of different modes for correcting a detected rotational position of said motor to be used to generate said control deviation so as to suppress tracking error of said control object from said variable position reference caused by mechanical transmission error of said transmission mechanism;

a compensation selecting means for selecting one of said first and second tracking error compensating means based on whether the detected position of said control object changes during a period after said control object stops at a target position and before a next variable position reference is inputted to said control deviation generating means; and a compensation determining means for determining a compensation amount which said second tracking error compensating means requires to perform compensation based on the detected position of said control object and a detected rotational position of said motor when said second tracking error compensating means is selected by said compensation selecting means;

wherein said first compensating means corrects the detected rotational position of said motor generating said control deviation so as to suppress said tracking error during a period after said next variable position reference is inputted and before said control object starts to move again;

wherein said second tracking error compensating means corrects the detected rotational position of said motor to be used to generate said control deviation so as to suppress said tracking error with a predetermined compensation amount in accordance with a feed direction of said variable position reference after said next variable position reference is inputted; and wherein said compensation selecting means selects said first tracking error compensating means when the detected position of said control object does not changes during a period after said control object stops at a target position and before said next variable position reference is inputted to said control deviation generating means and selects said second tracking error compensating means when the detected position of said control object changes during said period.

11. A position control apparatus as set forth in claim 10, wherein said compensation determining means holds first and second compensation amounts corresponding to directions of movement of said control object and determines said first and second compensation amounts in accordance with a direction of change of the detected position of said control object.

12. A position control apparatus as set forth in claim 11, wherein said second tracking error compensating means selects one of said first and second compensation amounts determined by said compensation determining means and corrects the detected rotational position of said motor to be used to generate said control deviation in accordance with a feed direction of said next variable position reference.

* * * * *